2,799,495

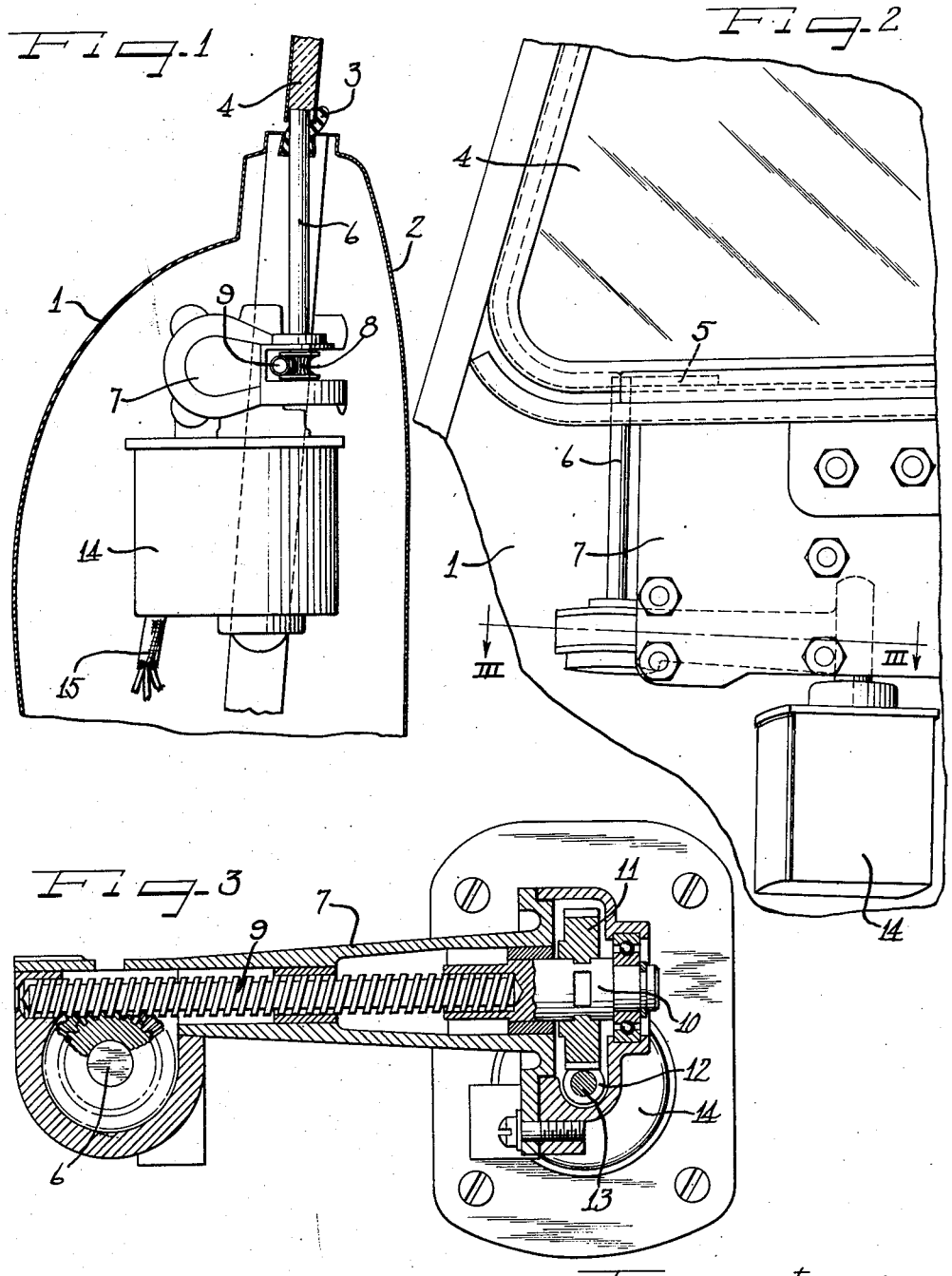

POWER DRIVE FOR PIVOTED WINDOW

Leo J. Wubbe, Detroit, Mich., assignor to Houdaille Industries, Inc., a corporation of Michigan Application February 8, 1954, Serial No. 408,861

2 Claims. (Cl. 268—117)

This invention relates to improvements in a power drive for a pivoted window, and more particularly to power means for actuating a pivotal window in either direction, the invention being highly desirable for use in connection with the vent windows in the forward doors of automotive vehicles, although the device will obviously have other uses and purposes as will be apparent to one skilled in the art.

In the past, pivotal windows, both in automotive vehicles, and in buildings, have been operated most frequently either by releasing a latch and manually moving the window to the desired extent in either direction, or else by rotating a crankarm or handle to move the window in either direction by mechanical means. In either case manual effort to effect the actual movement of the window is necessary. Also, with both these arrangements, depending upon how much effort has been previously exerted in closing the window, a considerable effort on the part of the operator is frequently necessary in order to overcome jamming of the latch or window. For example, when a window is closed with the aid of mechanical means, the operator rotating a crankarm, a rigid worm actually effects the movement of the window, and when the window reaches closed position there is a slight jamming, requiring material effort to start the window in the reverse direction. This is particularly true in connection with automobile vent windows. Latch means often embody a threaded keeper which functions as a lock, and it is irksome to a driver to first release the keeper, press it in, effect a movement of the latch, and then push the window open. Likewise, it is irksome to a driver to endeavor to force a crank handle in order to overcome a jammed window. In either event, the driver's attention is temporarily directed away from the road, and one arm must be utilized to manipulate the apparatus. It is therefore desirable to employ power means to actuate such a window.

With the foregoing in mind, it is an important object of the instant invention to provide power actuated means for moving a pivoted window.

Another object of the invention is to provide mechanism driven by an electric motor for actuating a pivoted window in either direction.

A further feature of the invention resides in the provision of power driven mechanism to operate a pivotal window, which mechanism involves automatically self-relieving parts, so that jamming of the window cannot result.

Another object of the invention is the provision of power driven means for actuating a pivoted window, which means include a torsionally resilient or torsionally flexible worm which automatically eliminates jamming of the window at the limit of its movement in either direction.

Still a further feature of the invention resides in the provision of mechanism for moving the vent window of an automobile driven by an electric motor, and embodying as a component part a flexible, torsionally resilient worm drive element.

It is still a further feature of the invention to provide mechanism for controlling the vent window of an automobile which may be operated to move the window in either direction by the simple expedient of pressing a button or lever on the part of the operator.

While some of the more salient features, characteristics and advantages of the instant invention have been above pointed out, others will become apparent from the following disclosures, taken in conjunction with the accompanying drawing, in which—

Figure 1 is a fragmentary vertical sectional view through an automobile door and vent window associated therewith, showing in elevation mechanism embodying the improvements of the instant invention for operating the vent window;

Figure 2 is a fragmentary side elevational view of the structure of Fig. 1, taken from within the inner door panel; and Figure 3 is an enlarged plan sectional view of the operating mechanism taken substantially as indicated by the line III—III of Fig. 2, looking in the direction of the arrows.

As shown on the drawings:

While the instant invention may be utilized for the actuation of substantially any style pivoted window, for purposes of convenience and clarity it is herein illustrated and described in connection with the operation of a vent window in an automobile door, this being one of the uses for which the instant invention is greatly desired at the present time.

The illustrated embodiment of the instant invention is shown mounted in an automobile door which includes an outer panel 1 and an inner panel 2. Above these panels is disposed a sealing element 3 against which a pivotal vent window 4 abuts when closed. On the underframe of this window is a lateral element 5 fixedly connected at one end to a pivot shaft 6, the structure so far described being substantially standard in automotive vehicles.

The instant invention includes a housing 7 which may be mounted in any suitable manner, preferably between the door panels 1 and 2, the entire structure, exclusive of electrical connections to the battery, being carried preferably inside the door, although if necessary a portion of the apparatus could be included inside the front fender or in any adjacent desirable territory.

The housing 7 supports the structure in the illustrated embodiment of the invention, suitable bearing surfaces being provided in the usual manner for the various shafts and rotating elements. On the lower end of the pivot shaft 6 is a worm wheel 8 which is in mesh with an elongated worm 9 adjacent one end of the worm. The opposite end of the worm is fixedly secured inside a hollow in a stub shaft 10 which has secured thereto a worm wheel 11 in turn meshing with a worm 12 carried on the shaft 13 of an electric motor 14. The electric motor 14 is preferably a reversing motor which may be driven in either direction depending upon which direction a switch may be thrown. The leads from the motor 14 may be enclosed in a cable 15, as seen in Fig. 1 and suitably connected to switch means and the vehicle battery. Normally, there would either be a double throw switch, or two separate switch buttons or push buttons to actuate the motor in the desired direction.

It should be particularly noted that the worm 9 may comprise a flexible wire cable core portion, around which a relatively large wire is wound in helical fashion and fixedly secured, the external large wire functioning as the threads of the worm. Such a worm need not be mounted necessarily in a straight position, but functions equally as well with a bend therein, since it is a flexible worm. Further, owing to its particular construction, the worm is torsionally resilient; i. e. a slight twisting of the worm may be effected, and the worm will inherently tend to untwist when pressure thereon is released.

Now in operation, the instant invention is extremely simple. It is only necessary for the driver of the vehicle or a passenger in the front seat, in the case of the illustrated embodiment of the invention, to merely energize the motor for operation in the right direction to either open or close the pivotal vent window. At the end of its travel in either direction, the window or mechanism cannot be jammed because of the character of the worm 9. Assume, for example, that the window is being moved to closed position. When it reaches closed position, the motor is deenergized, but obviously it will not stop precisely instantaneously. Accordingly, if the worm 9 was rigid, the entire mechanism or at least portions thereof would tend to jam to such an extent that upon again starting the motor in the reverse direction the motor would not have power to overcome the jamming. However, with the instant invention, the extra little power given by the motor following the conclusion of a movement of the window is automatically taken up by the torsional resiliency of the worm 9, and that same torsional resiliency acting inherently in the reverse direction aids the motor in again starting the window on the opposite movement, so that jamming cannot result. While the shaft or worm 9 is twisting about its axis, the motor will come to a stop. The inherent frictional resistance of the system, including the worm wheel 11 and the worm 12, prevents the torsional stress in the shaft from rotating the stopped motor in reverse. This remaining stress, however, will aid in starting the motor when it is reversed to aid in again opening the window as discussed above.

From the foregoing, it is apparent that I have provided a novel power actuated pivotal window operating mechanism, which is exceedingly simple and economical in construction, highly durable, and which operates in a manner to eliminate jamming of the window or parts of the mechanism at the end of a movement in either direction. In the case of a vent window in a vehicle, it will be noted that the driver by only a simple closure of a switch, may effectively control the window for movement to a desired extent in either direction, and the driver's attention need not be removed from the road ahead, nor need he exert any strength, or keep his hand away from the steering wheel for any longer than a very minimum time.

It will be understood that modifications and variations may be effected without departing from the scope of the novel concepts of the present invention.

I claim as my invention:

1. A power operated automobile window mechanism comprising a glass automobile ventilation window, a frame for guiding the window for movement between an open position and a closed position and providing a stop when the window reaches closed position, a support connected to the window for moving it between open and closed position, an elongated rotatable driving shaft connected at one end to operate the support and being torsionally flexible and resilient about its rotational axis, a reversible electric motor adapted to be connected to drive the other end of the shaft, and a reduction gear drive between the reversible motor and said other end of the shaft having sufficient friction to prevent the torsional stress of the shaft from reversing the motor when the window reaches closed position whereby the shaft will resiliently yield and twist about its axis when the window reaches its closed position to relatively gradually increase the application of power to the window and whereby the shaft may remain twisted to hold the window closed and to aid in starting the motor in its reverse direction for opening the window.

2. A power operated automobile window mechanism comprising a glass automobile ventilation window mounted in a frame for movement relative to the frame between a closed position and an open position, the frame forming a stop for the window in closed position, a support shaft pivotally mounted in the frame and connected to the window forming a pivotal axis therefor for movement of the window between said positions on said shaft, a worm gear mounted on the shaft to drive the shaft in rotation and pivot the window, an elongated threaded drive shaft carrying external threads in driving engagement with the worm gear at one end of the shaft, a reversible electric motor drivingly connected to drive the other end of the drive shaft for operating the window, and a speed reducing gear means non-yieldingly connected between the drive shaft and the electric motor, said drive shaft being torsionally flexible and resilient causing the shaft to twist from the resistance of the window without breaking the window when it reaches closed position with overtravel of the motor whereby the force transmitted from the motor to the window will be gradually increased to prevent jamming the window when it is stopped by its frame, said speed reducing gear means and motor having sufficient frictional resistance to maintain torsional stress in the drive shaft whereby the torsionally resilient shaft will tend to hold the window resiliently closed and aid the motor in starting in the reverse direction to open the window.

References Cited in the file of this patent

UNITED STATES PATENTS

| | | |
|---|---|---|
| 1,983,962 | Barber et al. | Dec. 11, 1934 |
| 2,154,245 | Levey | Apr. 11, 1939 |
| 2,332,731 | Lakin | Oct. 26, 1943 |
| 2,365,454 | Chandler et al. | Dec. 19, 1944 |
| 2,684,847 | Barden | July 27, 1954 |
| 2,729,444 | Horton | Jan. 3, 1956 |

FOREIGN PATENTS

| | | |
|---|---|---|
| 457,572 | Great Britain | Dec. 1, 1936 |
| 546,430 | Great Britain | July 13, 1942 |